A. M. LANGWORTHY.
AMUSEMENT DEVICE.
APPLICATION FILED AUG. 24, 1910.

1,002,162.

Patented Aug. 29, 1911.

WITNESSES
INVENTOR
Attorney

A. M. LANGWORTHY.
AMUSEMENT DEVICE.
APPLICATION FILED AUG. 24, 1910.

1,002,162.

Patented Aug. 29, 1911.

WITNESSES

INVENTOR
Arthur M. Langworthy
Attorney

UNITED STATES PATENT OFFICE.

ARTHUR M. LANGWORTHY, OF NEW YORK, N. Y.

AMUSEMENT DEVICE.

1,002,162.   Specification of Letters Patent.   Patented Aug. 29, 1911.

Application filed August 24, 1910. Serial No. 578,634.

*To all whom it may concern:*

Be it known that I, ARTHUR M. LANGWORTHY, a citizen of the United States, residing at New York, in the county of New York and State of New York, have invented certain new and useful Improvements in Amusement Devices, of which the following is a specification.

My invention relates broadly to amusement devices.

The invention aims to provide an amusement device, for creating great fun and excitement, yet being safe so that its passengers are not subjected to any risk and receive no injuries.

The initiation ordeal which is firmly implanted in the public mind in connection with a lodge, fraternity or the like, is carried out in my amusement device. The passenger on its travel, is put through ordeals or degrees, which are amusing and very exciting. A novel vehicle is provided for holding the passenger, and such vehicle is started upon its travel by means of a mechanically operated donkey or kicking mechanism. This kicking mechanism quickly starts the vehicle upon its travel and sends the same along the track a certain distance, when said vehicle engages a suitable cable and is further propelled by the same. The passenger vehicle is in the form of a chair-casing, which is apparently supported by a mechanically operated goat. This goat is capable of moving away from the chair-casing and thus disappearing. After the vehicle including the chair-casing has been started by the kicking mechanism the goat rises and apparently carries the said chair-casing along the track. The chair-casing and goat then pass into a cave or tunnel within which are provided suitable scenes. These scenes preferably represent the initiation of a person into a lodge. The actors in this initiation are suitably costumed to produce the desired effect upon the traveler. The chair-casing and goat carrying the traveler continue the travel and put the traveler through what might be termed a third degree. The traveler is made to pass through a large hoop, near which is disposed a mechanically operated demon-figure, holding a blade or knife above the hoop. When the passenger approaches the hoop a circuit is closed and the mechanically operated demon-figure is actuated, whereby the blade is made to move above the hoop. After the passenger has passed the hoop the circuit is broken. The passenger continues his travel and approaches a large snake having its mouth open apparently for swallowing the passenger. When this snake is reached the goat passes down from the chair-casing and goes into the snake's mouth while the chair-casing with its passenger travels upon the snake's back. The approaching of the snake is in effect the fourth degree. The traveler then enters into the snake's cave and coming out of the same passes between rows of mechanically operated Indian-figures. The passenger is thus made to run the gauntlet through these Indian-figures, which may be termed the fifth degree. The vehicle then continues its travel and returns to its starting point.

The details of the device will be set forth in the following description, reference being had to the accompanying drawings forming a part of this specification, wherein.

Like numerals are employed to designate like parts throughout the drawings.

In the drawings wherein is illustrated a preferred embodiment of my invention, the numeral 1 designates a structure preferably having the design as shown. This structure is provided with an arch-way 2 within which is disposed a floor 3 provided with slots 4, as shown. Pairs of tracks 5 extend below the floor 3. The tracks 5 are inclined up and down, as shown, in accordance with the practice in roller-coasters and scenic-railways.

Figure 4:
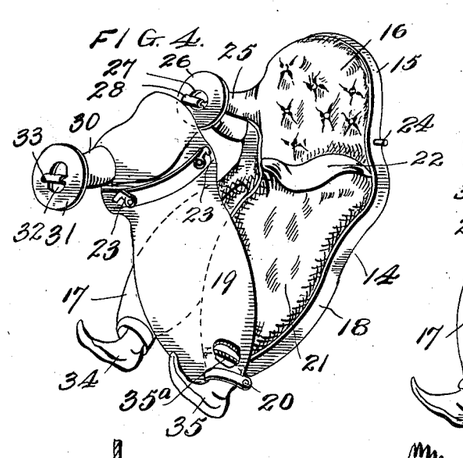
Fig. 4 is a perspective view of the chair-casing the same being shown unoccupied and opened.
Figure 5:
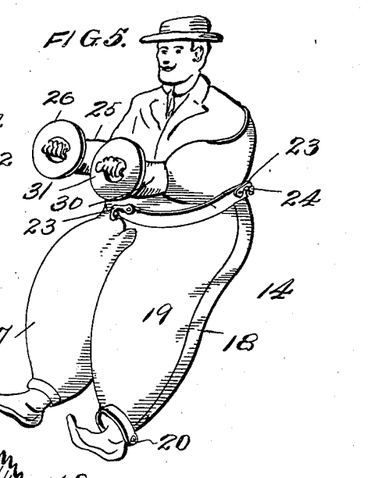
Fig. 5 is a perspective view of the same, the same being shown occupied and closed.

Each of the tracks 5 comprises rails 6 engaged by flanged wheels 7 suitably connected with a car 8. The car 8 is provided centrally thereof with a casting 9, which is bolted to the same as shown at 10. This casting 9 has a slotted portion 11 which extends downwardly below the car 8 and rails 7 and terminates in a head 12. This head 12 is employed to actuate mechanism for closing a circuit, as will be explained hereinafter. The casting 9 is provided at its upper end with oppositely extending horizontal arms 13 which have rigid engagement with pairs of chair-casings 14, for supporting the same. These chair-casings may preferably be formed of pressed steel, although any other suitable material may be employed. Each of the chair-casings 14 comprises a back or body portion 15, provided upon its inner side with suitable padding 16. The chair-casing 14 further comprises an inner leg 17 having rigid connection with the back 15 and an outer leg formed of separable sections 18 and 19. The section 19 is pivotally connected with the section 18, as shown at 20. As shown in Fig. 4, the section 19 is moved away from the section 18 whereby the traveler may occupy the chair-casing. The inner walls of the legs of the chair-casing are provided with suitable padding 21. A saddle 22, which may be preferably formed of leather, is provided at the junction of the legs. When the traveler has taken his place in the chair-casing, as shown in Fig. 5, the section 19 is brought into engagement with the section 18 and retained in such position by means of hooks 23 which engage pins 24. The leg 17 continues upwardly and has rigid engagement with an arm casing 25, which is also rigidly connected with the back 14. This arm-casing is provided at its outer end with a cuff 26 having a suitable opening 27 formed therethrough for receiving the traveler's hand. A grip 28 is rigidly connected with the cuff 26, as shown. A corresponding arm-casing 30 is rigidly connected with the section 19, as shown. This arm-casing is provided with a cuff 31 having suitable opening 32 formed therethrough. A grip 33 is rigidly connected with this cuff. The function of the grips 28 and 33 is clearly illustrated in Fig. 5, the same serving as means whereby the traveler may steady himself. The legs of the chair-casing are provided with feet 34 and 35. The foot 34 is secured to the leg 17 in any suitable manner, while the foot 35 is suitably connected with the section 18. The traveler does not place his feet within the feet 34 and 35 for the same are formed closed by means of a foot rest 35$^a$. Special attention is called to the fact that the inner leg 17 is formed much smaller in circumference than the outer leg. A lady may ride in the chair-casing 14 by occupying the outer leg only. The inner legs 17 may have suitable connection with the casting 9. Each of the chair-casings 14 which are substantially like a pair of trousers, are normally astride a mechanically operated goat 36. This goat comprises a suitable shell 37 which is provided with brackets 38, having pivotal connection with the free end of a horizontal rod 39, as shown. This horizontal rod is provided centrally thereof with spaced collars 40. The rod 39 is disposed for vertical movement within the slot formed through the portion 11 and the collars 40 engage this portion to prevent the lateral displacement of said rod. The rod is limited in its downward movement by the head 12.

Disposed within the shell 37 of the goat as shown, is an inverted V-shaped casting 41 having pivotal connection with the rod 39. Each end of the casting 41 has a shaft 42 journaled therethrough, as clearly illustrated in Fig. 7. This shaft has a wheel 43 rigidly mounted upon one end thereof and a flange wheel 44 rigidly mounted upon the opposite end thereof. The wheel 43 engages a flat rail 45 disposed upon the inner side of the rail 6. The flange wheel 44 is adapted to engage a depressing rail 46, as clearly illustrated in Fig. 6. One of the wheels 43 connected with each of the castings 41 carries a crank pin 47, having pivotal connection with one leg of the shell of the goat.

From the description of the above referred to parts it is obvious that the chair-casing 14 is not supported by the goat, although the same is astride of said goat. When the rail 45 is depressed or disposed below the rails 6, as clearly illustrated in Fig. 6, the goat will be drawn downwardly or made to disappear. While the goat is traveling along the rail 45, in its raised or lowered position, the shell 37 is given an oscillatory movement so that the goat appears to lope. This loping movement of the goat is imparted to the same by virtue of its leg having pivotal connection with the wheel 43, as above stated. The chair-casings 14 are provided with rollers 48, as shown. These rollers do not engage the shells of the goats, but are employed to cooperate with snakes to be referred to. The car 8 may further be provided outwardly of the wheels 6 with flanged wheels 49, to coöperate with retaining rails 50. The retaining rails 50 may or may not be employed as is found necessary in the practical construction of the device.

Figure 1:
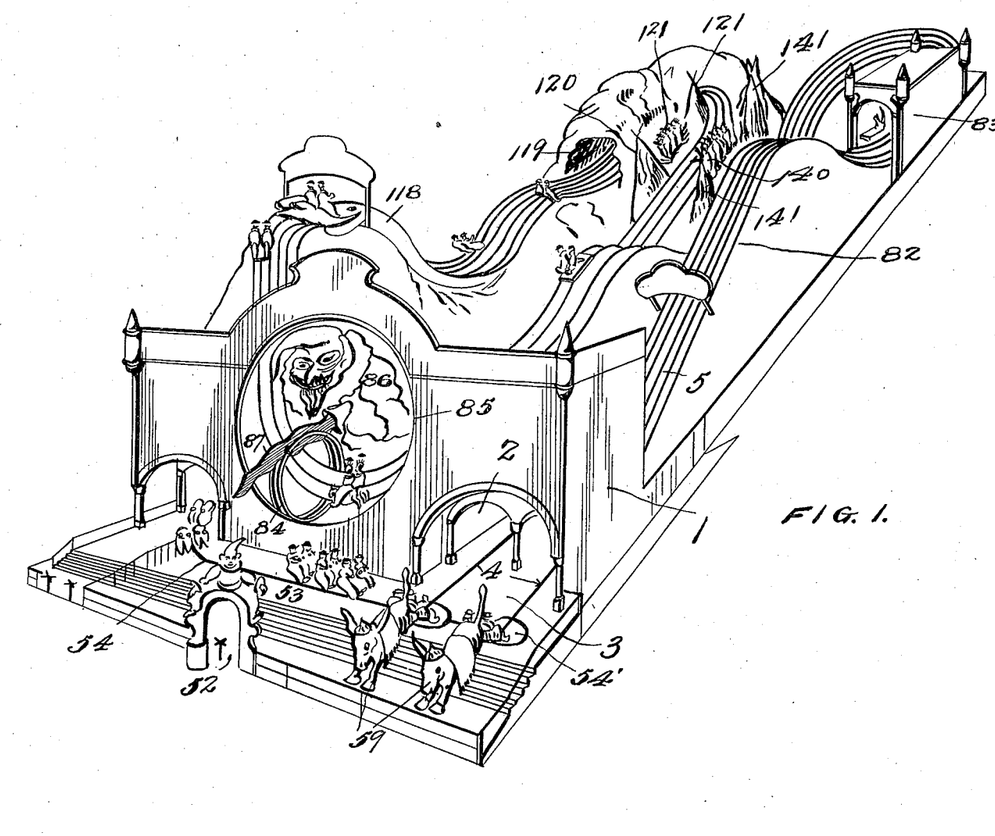
Figure 1 is a perspective view of the device as a whole.
Figure 2:
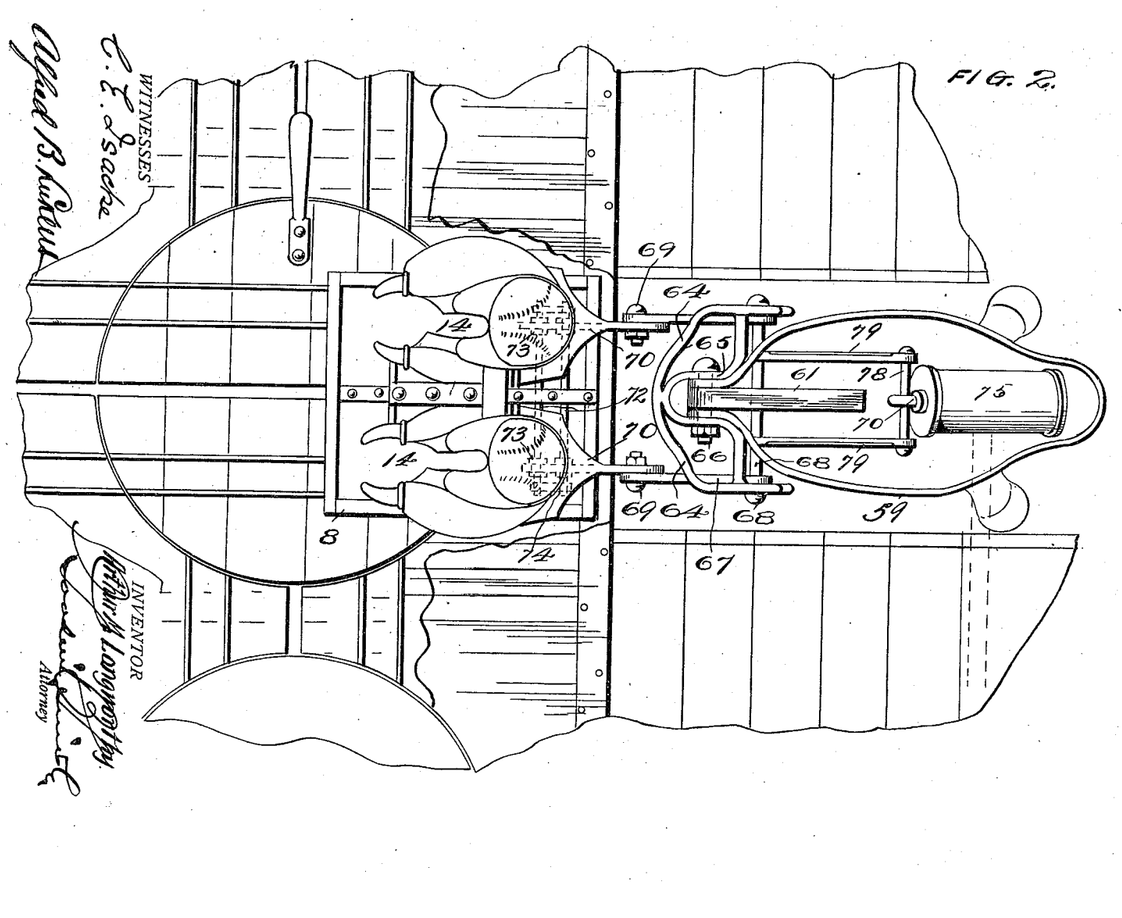
Fig. 2 is an enlarged plan view of the kicking mechanism.

The passengers first enter through the doorway 52, shown in Fig. 1, and arrive upon the platform 53 where they take their seats in the chair-casings 14. This platform 53 is provided with a suitable slot 54 to receive casting 9, it being understood that the tracks for the car 8 and goats are disposed below this platform. The chair-casings 14 are moved transversely along the platform 53 and positioned upon a turntable 54'. The turn-table 54' may be of any well known or preferred type and only a general description of the same will be given. This turn-table comprises a stationary base 55 provided with a circular track 56 upon which is rotatably mounted a car 57. This car carries rail-sections 6 and 45, as shown. The rails 45 are depressed or arranged below the rails 6 so that the goats may be in their lowermost position and under the platform 53. In Fig. 2 the platform 53 is broken away for the purpose of more clearly illustrating the rails 6 and 45 above referred to. The car 8 is then backed into its starting position as shown in Figs. 1 and 2. In Fig. 1 is illustrated a pair of like mechanical donkeys or kicking mechanisms 59 for starting the car 8 upon its travel. As these kicking mechanisms are alike a description of one of them will suffice.

Each of the kicking mechanisms comprises a shell 59 resembling a donkey. The shell 59 may preferably be formed of pressed steel although any other suitable material may be employed. This shell is supported by and rigidly connected, as shown at 60, with a casting 61 disposed within said shell. This casting is rigidly connected as shown at 62, with an upright 63 which has rigid connection with a suitable foundation. The front legs of the donkey are stationary while its rear legs are movable. Each of the rear legs comprise a hip section 64. These hip sections are formed integral and are suitably connected with a U-shaped section 65, having straight ends as shown. The U-shaped section 65 straddles one end of the casting 61 and is pivoted to the same by means of a bolt 66. Each of the hip sections 64 is provided with a shin section 67, which is pivotally connected to the same by means of a bolt 68 having connection with the two hip sections, as shown. The shin sections 67 have pivotal connections as shown at 69, with hoof members 70. These hoof members are provided with horizontally disposed longitudinal slots 71 within which are disposed transverse spaced rods 72, which lie in the same horizontal plane. These rods are provided upon opposite sides of the hoof members 70 with spaced collars 73, for preventing the lateral displacement of said hoof members. The rods 72 which may be termed guide rods are rigidly supported by means of stationary castings 74. An engine cylinder 75 is disposed within the head of the shell of the donkey and has rigid connection with the same by any suitable means. Within this cylinder is mounted to reciprocate a piston 76 having suitable connection with a rod 77. This rod is pivotally connected, as shown at 78, with pitmen 79, which have their outer ends pivotally connected with the bolt 68. The cylinder 75 is provided near one end thereof with an inlet pipe 80 through which steam compressed air or the like may be fed to within the cylinder for forcing the rod 77 outwardly. The cylinder 75 may be provided at its opposite end with a pipe 81 for feeding steam or the like into the cylinder 75 for returning the piston to its normal starting position. No description of the steam boiler or air compressor will be given as any well known or preferred types may be employed.

Figure 3:
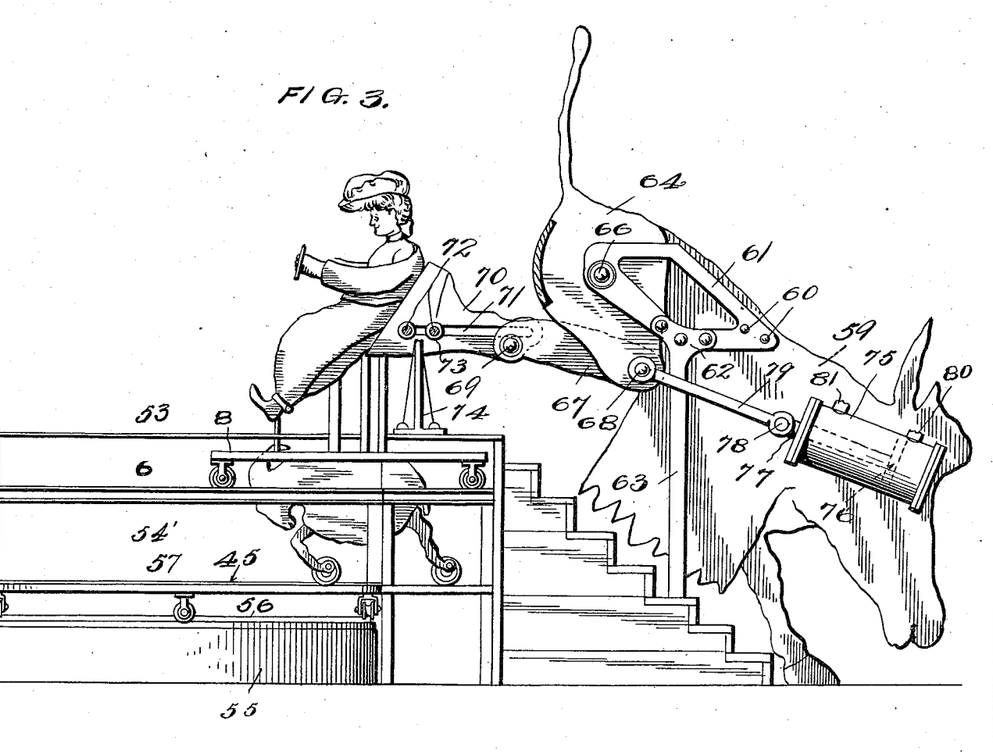
Fig. 3 is a side view of the same.

As shown in Figs. 1, 2 and 3, the chair-casings 14 when in their starting positions are disposed in engagement with the hoof members 70. It is obvious that when the piston is forced outwardly, the hip sections 64 will be oscillated whereby the hoof members 70 will be moved in a substantially horizontal plane to kick or shove the car 8 along its track. This starting movement of the car sends the same a certain distance along the track when the car engages a cable which further propels the same. No particular form of cable or clutch mechanism for connecting the same with the car 8 has been shown or described, as any preferred or well known type may be employed. As shown in Fig. 3 the goat is in its lowermost position and out of view of the traveler. After the car 8 has gone a certain distance along the track, the rails 6 and 45 being disposed in substantially the same horizontal plane, said goat rises and assumes a position between the legs of the chair-casing, as clearly illustrated in Fig. 7. The car 8 is now drawn up one side of the incline 82 and runs down the other side of the same to pass through a cave or tunnel 83. Within this cave or tunnel are provided suitable scenes, such as the initiation of a person into a lodge or fraternity. The car 8 now passes out of the cave 83 and continues along its track to pass through two large hoops 84. The structure 1 is provided centrally thereof with a circular opening 85 whereby the by-standers may see a large mechanically operated demon-figure 86, holding in its hand a blade or knife 87. By reference to Fig. 13 it will be seen that the knife 87 is disposed between the upper portions of the spaced hoops 84, and pivotally connected therewith as shown at 88. The handle portion of the blade 87 is pivoted as shown at 89, to the hand of the figure 86. This hand is connected with the arm 90, which is pivoted at 91 to the body portion of the demon-figure. It is to be understood that the details of construction of the arm and associated members of this demon-figure do not ordinarily appear, the same being covered up, as shown in Fig. 1. The end of the handle of the blade 87 has pivotal connection, as shown at 92, with a pitman 93 having its opposite end pivoted as shown at 94, to a wheel 95. This wheel is rigidly mounted upon an axis 96 of a motor of any preferred or well known type. This motor is concealed within the body of the demon-figure. By the description of the above referred to parts it is obvious that if the motor is set in operation, the arm 90 will be oscillated and the knife 87 also oscillated.

Figures 11, 12:
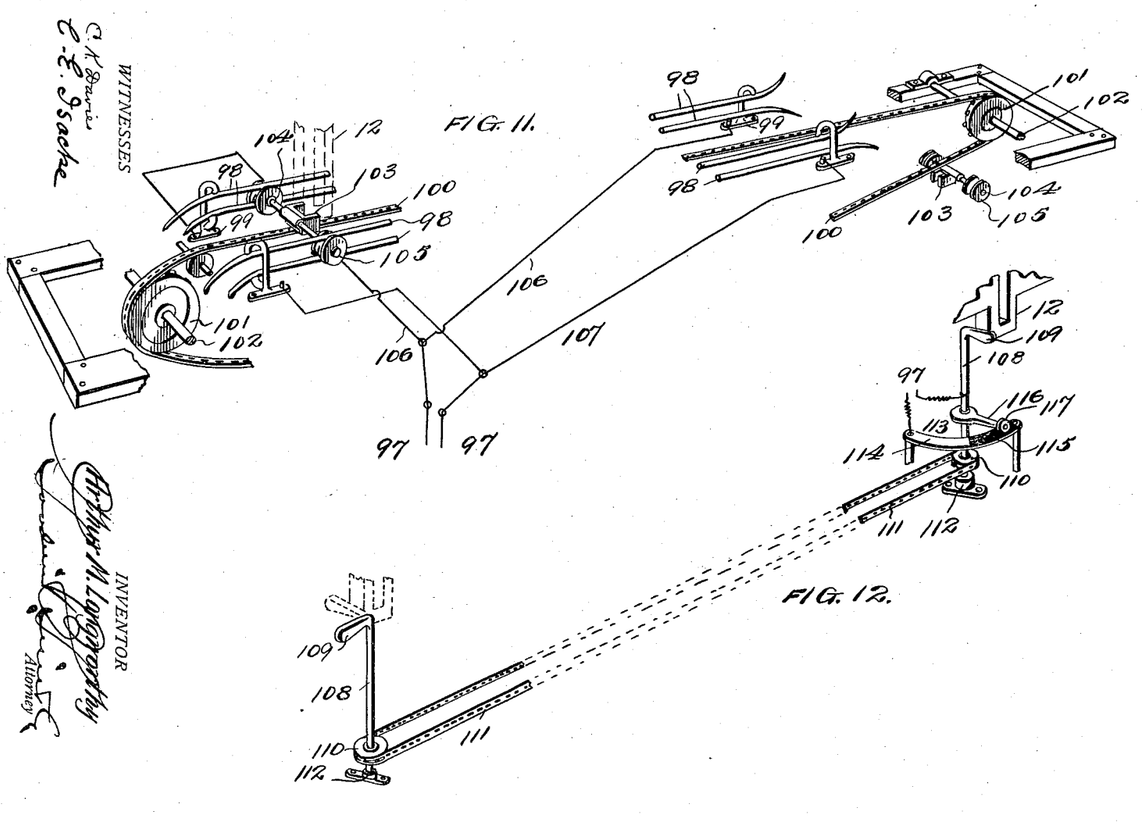
Fig. 11 is a fragmentary perspective view of the mechanism employed for closing a circuit to operate the demon-figure.
Fig. 12 is a similar view of a modified form of mechanism for closing the circuit to operate the demon-figure.
Figures 13, 15, 16:
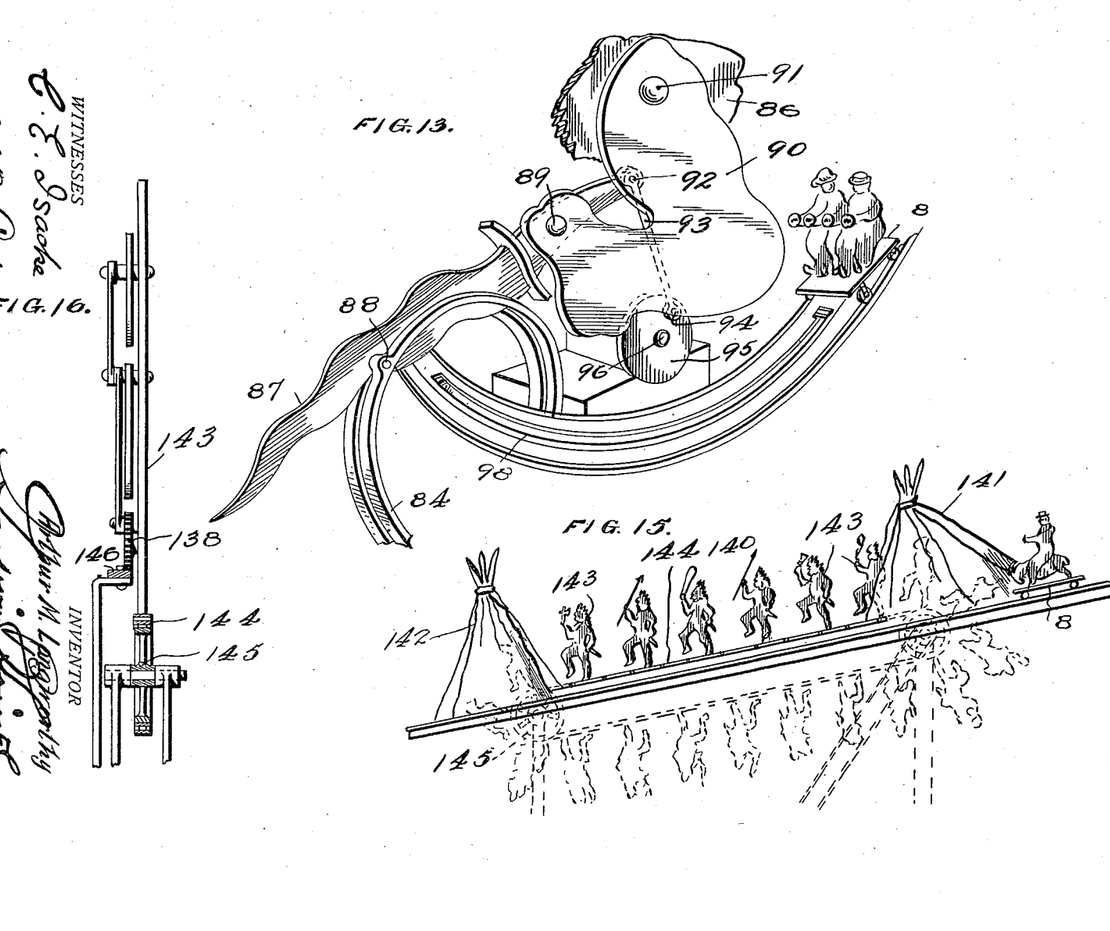
Fig. 13 is an enlarged detail perspective view of the movable arm of the demon-figure and associated members.
Fig. 15 is a similar view of the Indian-figures showing a modified apparatus for operating the same.
Fig. 16 is a vertical cross-section taken through Fig. 15.

Current is supplied to the motor through lead wires 97 (see Fig. 11) which are suitably connected with a dynamo or other source of current, (not shown). The circuit including the wires 97 for supplying the current to the motor is normally opened, but means are provided whereby this circuit may be closed when the car comes within a certain distance of the hoops 84. These means are actuated by the approaching car. The means above referred to, comprise spaced pairs of contact rails 98, which are supported by brackets 99. These brackets are insulated from and rigidly connected with suitable supports. As shown in Fig. 13 the pairs of contact rails 98 are disposed between the track rails 6 and extend in advance of the hoops 84. As shown in Fig. 11, an endless chain 100 is provided, operating between the pairs of contact rails 98 and trained about spaced sprocket wheels 101, which are disposed outwardly of the ends of said contact rails. These sprocket wheels 101 are mounted upon shafts 102 which are suitably journaled through desired supports. The endless chain 100 has sockets 103 suitably secured to the same, which have contact shafts 104 journaled through portions thereof. These contact shafts carry flanged contact wheels 105 adapted to operate between and engage the rails 98. One of the lead wires 97 is electrically connected with branch wires 106 having electrical connection with the brackets 99 for supporting one pair of the contact rails 98. The other wire 97 has electrical connection with branch wires 107 which are electrically connected with the brackets 99 for supporting the other pair of contact rails 98. From the description of the above referred to parts it is obvious that when the contact shaft 103 is moved so that the contact wheels 105 are disposed between and engage the pairs of contact rails, the circuit will be closed and current supplied to the motor for actuating the arm of the demon-figure 86. The movement of the contact shaft 103 is effected by the engagement of the head 12 (see Fig. 6) with the socket 103. The contact wheels 105 are first urged into engagement with the pairs of contact rails 98 and made to travel along the same until they pass the opposite ends of the same, when the circuit will be broken, which is effected after the car 8 has passed through and beyond the hoops 84. The movement of one of the shafts 103 into engagement with the pairs of contact rails and finally out of engagement therewith, effects a movement of the other contact shaft 103, whereby the same is positioned so that it may be urged into engagement with said contact rails by the next car.

Figure 6:
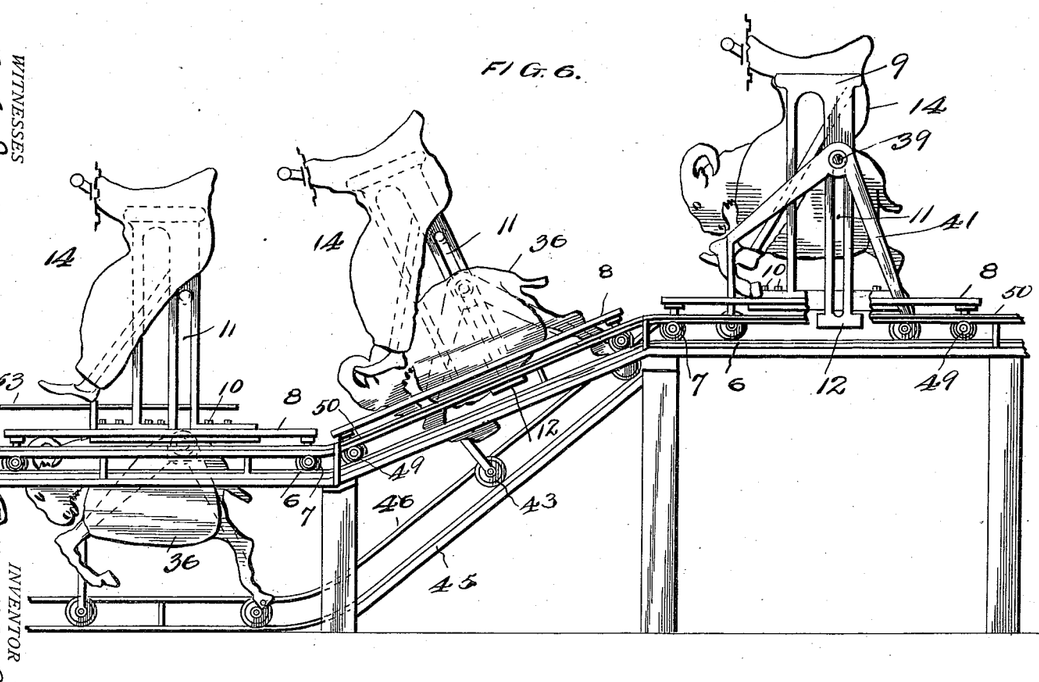
Fig. 6 is a detail view of a portion of the track showing the manner in which the goats are lowered or made to disappear.
Figure 7:
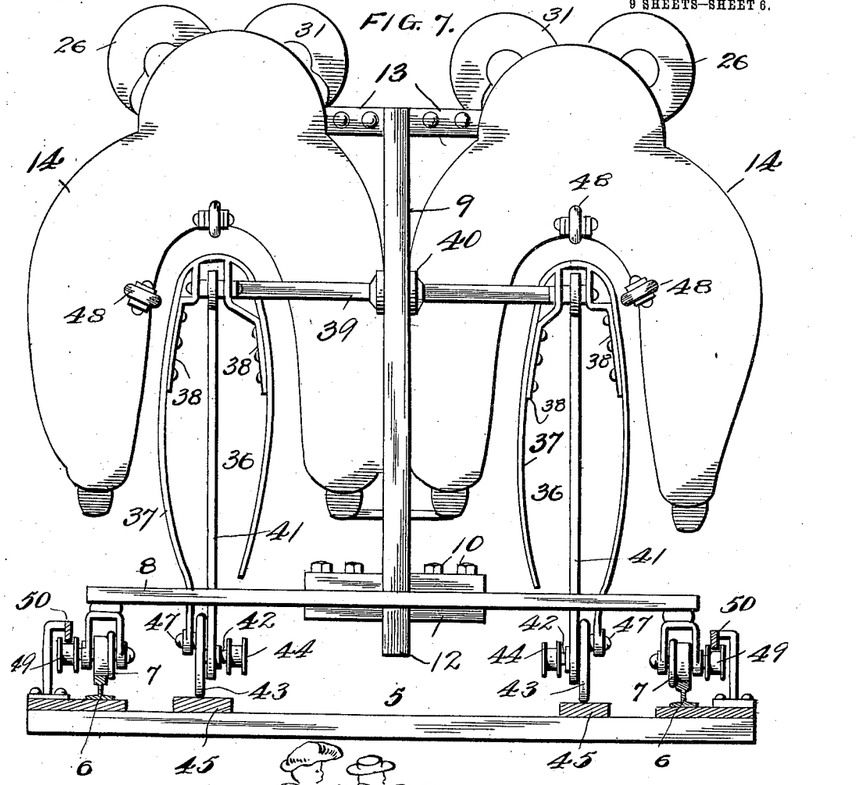
Fig. 7 is an end view of the passenger-vehicle.
Figure 8:
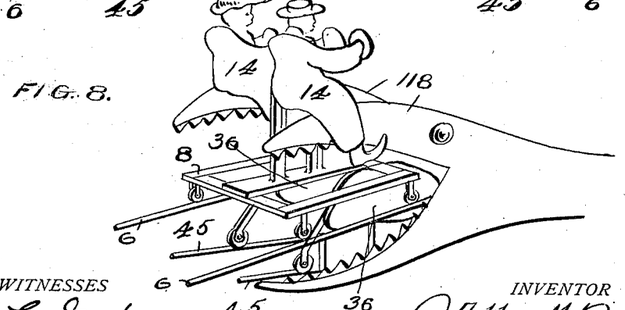
Fig. 8 is an enlarged perspective view of the head of the snakes and associated members.

In Fig. 12 I have illustrated a simpler mechanism for closing and opening the above referred to circuit. In this figure are illustrated vertically disposed shafts 108, having their ends provided with horizontal extensions 109. These horizontal extensions are disposed at right angles to each other. The shafts 108 carry fast sprockets 110 for engagement with a sprocket chain 111. The shafts 108 are journaled through suitably supported bearings 112. The bearings 112 are insulated from their support. Adapted to coöperate with one of the shafts 108, is a segmental strip 113, one portion thereof 114 being formed of conducting material and the other portion 115 being formed of an insulating material. The shaft 108 is spaced from this strip 113 and carries a contact arm 116 having rigid engagement therewith and provided with contact wheel 117 to travel upon the strip 113. The lead wire 97 in this form of contact mechanism is connected with the shaft 108 and the other lead wire is connected with the conducting portion 114. It is obvious that when the contact roller engages the portion 114, the circuit will be closed. The movement of the shaft 108 for closing this circuit is effected by the engagement of the head 12 with the horizontal extension 109. The circuit is thus closed and the other horizontal extension 109 is thrown into the position indicated by the dotted lines. The head 12 next engages this other horizontal extension and rotates its shaft 108, which rotation is imparted to the other shaft 108 and the circuit opened. After the car 8 has passed through the hoops 84, the same travels toward snakes 118, illustrated in Figs. 1 and 8. These snakes are disposed between the rails of the track and have their mouths open apparently to receive the car and its traveler. Adjacent the mouths of these snakes, the rails 45 are depressed while the rails 6 are disposed above the same. As a result of the depression of the rails 45 the goats are carried downwardly, in a similar manner as illustrated in Fig. 6 and pass into the snakes' mouths or disappear. The car 8 continues its travel between the snakes. The chair-casings 14 now straddle the snakes and travel along the same. Should these chair-casings move too near the snakes said snakes will be engaged by the rollers 48, whereby excessive friction is prevented. The car 8 continues its travel and passes through a snake cave 119.

Figure 9:
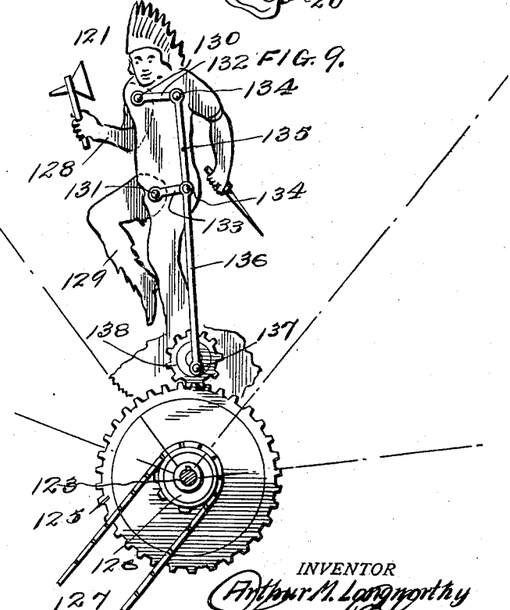
Fig. 9 is a side view of one of the mechanically operated Indian-figures.
Figure 10:
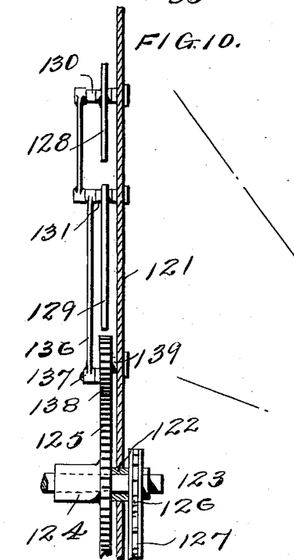
Fig. 10 is a central vertical section taken through Fig. 9.
Figure 14:
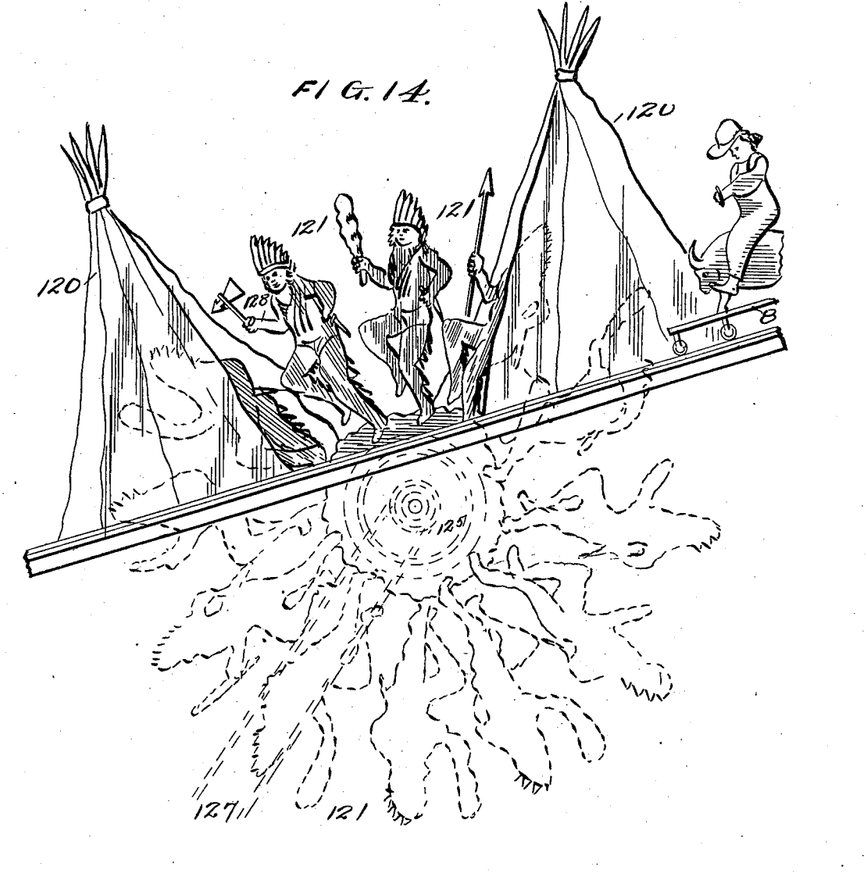
Fig. 14 is a perspective view of the Indian-figures.

At the side of the track outwardly of the snake cave 119, is arranged spaced tents 120 and passing from one tent to the other are mechanically operated Indian-figures 121. (See Fig. 14). As shown in Fig. 9, each of the Indian-figures 121 has one leg thereof rigidly mounted upon a sleeve 122 rotatably mounted upon a shaft 123. This shaft 123 is journaled through a suitably supported tubular bearing 124 which is stationary and cast integral with a large gear wheel 125. The sleeve 122 is cast integral with a sprocket wheel 126, engaged by a sprocket chain 127. This chain may be driven from any suitable source of power and rotates the Indian-figure rigidly secured to the sleeve 122 to cause the same to travel from one tent to the other. One arm and leg 128 and 129 respectively of the figure 121 are movable, the same being rigidly mounted upon shafts 130 and 131 respectively which are journaled through the body portion of the Indian-figure, as shown. These shafts 130 and 131 are provided respectively with levers 132 and 133 which are rigidly connected to the same. The levers 132 and 133 are pivotally connected as shown at 134, with a pitman 135. The lever 133 is further pivotally connected with a pitman 136 having pivotal connection with a crank pin 137 carried by a small gear wheel 138 in engagement with the large stationary gear wheel 125. The gear wheel 138 is rotatably mounted upon a stud shaft 139 which is suitably journaled through the stationary foot of the figure 121. From the description of the above referred to parts, it is obvious that as the figure 121 is being rotated about the shaft 123 the small gear wheel 138 is rotated by the stationary gear wheel 125, and an oscillatory movement accordingly imparted to the arm 128 of the leg 129. Near the Indian-figures 121 and upon the opposite side of the track, is arranged a row 140 of mechanically operated Indian-figures. Each of the Indian-figures 143 travels from a tent 141 to a tent 142. Each of these figures 143 is substantially like the figure 121 and therefore need not be described. This figure, however, instead of being rigidly mounted upon the sleeve 122 is rigidly mounted upon a link of an endless chain 144, trained about sprocket wheels 145. These wheels may be driven by any suitable means. The large gear wheel 125 is dispensed with and a stationary rack-bar 146 employed, the teeth of which engage the gear wheel 148. This gear wheel is thus rotated during the movement of the endless belt 144 whereby the movable limbs of the figure 143 are oscillated in precisely the same manner as described in connection with Figs. 9 and 10.

It is to be understood that the form of my invention herewith shown and described is to be taken as a preferred example of the same, and that certain changes in the size, shape and arrangement of parts may be resorted to without departing from the spirit of my invention, or the scope of the subjoined claims.

Having fully described my invention, I claim:—

1. In apparatus of the character described, a track, a vehicle to travel thereon, a blade arranged above and across said track, means to support said blade and having pivotal connection with the same, and a mechanically operated device simulating a human figure to oscillate said blade and permit the same to remain extending across the track.

2. In apparatus of the character described, a track, a vehicle to travel thereon, a hoop through which the vehicle passes, a blade having pivotal connection with said hoop, and means to oscillate said blade.

3. In apparatus of the character described, a track, a vehicle to travel thereon, a hoop through which the vehicle travels, a blade having slidable engagement with said hoop, and means to move the blade.

4. In apparatus of the character described, a track, a vehicle to travel thereon, a hoop through which said vehicle passes, and a blade having pivotal connection with said hoop.

5. In apparatus of the character described, a track, a vehicle to travel upon said track, an arch like structure through which said track passes, a blade pivotally connected approximately midway its ends with said arch like structure and disposed permanently above and across the track, and means to effect the movement of said blade.

6. In apparatus of the character described, a track, a vehicle to travel upon the same, a pair of spaced hoops through which said track passes, a blade pivotally connected with and disposed between the upper portions of said hoops, and means to effect the movement of said blades.

7. In apparatus of the character described, a track, a vehicle to travel upon the same, a demon-figure disposed alongside said track, including a movable arm, a blade connected with said movable arm, and extending above and across said track, and means to effect the movement of said arm.

8. In apparatus of the character described, a track, a vehicle to travel upon said track, means through which the track passes, a blade pivotally connected with said means and disposed above the track, an oscillatory arm connected with said blade, a link pivotally connected with the handle portion of said blade, and means to effect the reciprocatory movement of said link.

9. In apparatus of the character described, a track, a vehicle to travel thereon, an amusement device arranged near the track, means to actuate the said amusement device including a normally open circuit, circuit closing mechanism for said circuit, including contact rails, an endless belt disposed between said contact rails, means connected with said endless belt for electrically connecting said contact rails, and means carried by the car to effect the movement of the second named means and endless belt.

10. In a device of the character described, a track, an open structure surrounding said track, and a blade suitably mounted to move within the opening of said structure.

11. In a device of the character described, a track, an open structure surrounding said track, a vehicle to travel on said track, a blade suitably mounted to move within the opening of said structure, and means to move said blade.

12. In a device of the character described, a track, an open structure surrounding said track, a vehicle to travel on said track, a blade pivotally connected with said open structure, and electrically operated means to move said blade.

13. In apparatus of the character described, an open structure, a blade to move within the opening of said structure, said structure serving as a guide for said blade during the movement thereof, a track passing through the opening of said structure, a vehicle to travel on said track, and means actuated by said vehicle to effect the movement of said blade.

14. In apparatus of the character described, a track, a vehicle to travel thereon, a supporting structure near which the vehicle passes, a blade connected with said supporting structure, a device disposed near the track and simulating a human figure, said device including a movable arm having connection with said blade, and a motor disposed within said device to actuate said blade.

15. In apparatus of the character described, a track, a vehicle to travel thereon, a pair of spaced hoops through which the vehicle passes, and a blade movably mounted between said hoops.

16. In apparatus of the character described, a pair of spaced hoops, a blade disposed therebetween and having pivotal connection therewith, and means to conduct a passenger through said hoops.

ARTHUR M. LANGWORTHY.

Witnesses:
C. E. ISACKE,
ALFRED B. LUKENS.

Copies of this patent may be obtained for five cents each, by addressing the "Commissioner of Patents, Washington, D. C."